(12) United States Patent
Ohama et al.

(10) Patent No.: US 7,819,405 B2
(45) Date of Patent: Oct. 26, 2010

(54) MECHANICAL SEAL

(75) Inventors: Takao Ohama, Takasago (JP); Yasushi Amano, Takasago (JP); Hajime Tsubono, Takasago (JP); Kouji Akiyama, Tokyo (JP); Hidekazu Takahashi, Tokyo (JP)

(73) Assignees: Kobe Steel, Ltd, Kobe-shi (JP); Eagle Industry Co., Ltd., Tokyo (JP)

( * ) Notice: Subject to any disclaimer, the term of this patent is extended or adjusted under 35 U.S.C. 154(b) by 362 days.

(21) Appl. No.: 11/743,905

(22) Filed: May 3, 2007

(65) Prior Publication Data

US 2007/0262532 A1 Nov. 15, 2007

(30) Foreign Application Priority Data

May 12, 2006 (JP) ............................. 2006-134159

(51) Int. Cl.
*F16J 15/38* (2006.01)
(52) U.S. Cl. .................. 277/370; 277/390; 277/397
(58) Field of Classification Search ................ 277/358, 277/370, 390, 392, 393, 397
See application file for complete search history.

(56) References Cited

U.S. PATENT DOCUMENTS

| | | | | |
|---|---|---|---|---|
| 5,332,361 A | * | 7/1994 | Bras et al. | 415/231 |
| 5,556,110 A | * | 9/1996 | Marsi et al. | 277/397 |
| 5,863,047 A | * | 1/1999 | Ellis | 277/374 |
| 5,964,466 A | * | 10/1999 | Hintenlang et al. | 277/371 |
| 5,984,312 A | * | 11/1999 | Hintenlang et al. | 277/371 |
| 6,003,875 A | * | 12/1999 | Ellis et al. | 277/370 |
| 7,090,221 B2 | * | 8/2006 | Matsui et al. | 277/352 |
| 2003/0122313 A1 | * | 7/2003 | Takahashi | 277/358 |

FOREIGN PATENT DOCUMENTS

| | | |
|---|---|---|
| EP | 0 592 113 A1 | 4/1994 |
| JP | 11-173427 | 6/1999 |
| JP | 2003-74712 | 3/2003 |
| JP | 2004-293765 | 10/2004 |
| JP | 2007001540 A | 1/2007 |
| WO | WO 03062682 A1 * | 7/2003 |
| WO | WO 2004/029489 A1 | 4/2004 |

* cited by examiner

*Primary Examiner*—Vishal Patel
*Assistant Examiner*—Gilbert Y Lee
(74) *Attorney, Agent, or Firm*—Oblon, Spivak, McClelland, Maier & Neustadt, L.L.P.

(57) ABSTRACT

A mechanical seal that prevents deposition of a degradation material generated on a sliding interface is to be provided. In a mechanical seal including a sleeve that rotates with a rotating shaft, a seal cover fixed to a housing, a rotating ring attached to the sleeve and a fixed ring attached to the seal cover and disposed in sliding-contact with the rotating ring via a sliding interface perpendicular to the rotating shaft scraping member is provided on the sleeve at a position close to an inner edge of the sliding interface so as to remove a degradation material from the inner edge of the sliding interface.

6 Claims, 7 Drawing Sheets

MECHANICAL SEAL

FIELD OF THE INVENTION

The present invention relates to a mechanical seal.

BACKGROUND OF THE INVENTION

A mechanical seal that seals a gap between a rotating shaft and a housing thereof is to be manufactured according to Generals Rules of JIS-B2405. The mechanical seal includes a rotating ring which is air-tightly attached to a sleeve fitted to an outer circumference of the rotating shaft so as to rotate therewith, and rotates with the sleeve, and a fixed ring which is air-tightly attached to a seal cover fixed to the housing, and does not rotate. The rotating ring and the fixed ring are disposed in sliding-contact with each other at a sliding interface oriented perpendicular to the shaft, and constitute a seal ring in which one is a mating ring immovably disposed in an axial direction and the other is movable in an axial direction and biased by a spring so as to be pressed against the mating ring.

In the mechanical seal, a sealing fluid such as a lubricant provided on the sliding interface completely seals the gap of the sliding interface. An increase in temperature of the sliding interface because of the friction between the rotating ring and the fixed ring may cause deterioration of the sealing fluid, or may provoke denaturation of impurity such as a process gas dissolved in the sealing fluid, thereby leading to generation of a solid degradation material. Such degradation material incurs a damage called "blistering" on the sliding interface, once stuck thereon. The degradation material falsely extends the sliding interface thus to form a secondary sliding interface when stuck to a peripheral region of the sliding interface, which reduces the contact pressure between the rotating ring and the fixed ring, thereby resulting in degraded sealing performance of the mechanical seal.

To prevent the generation of the degradation material, it is effective to reduce the contact pressure or the sliding-contact area between the rotating ring and the fixed ring to thereby reduce the heat generation, however this incurs a disadvantage that the sealing performance is degraded.

Alternatively, as disclosed in JP-A2004-293765, a flow path called "hydro-cut portion" for the sealing fluid may be provided for efficiently cooling the rotating ring and the fixed ring with the sealing fluid. This method, however, leads to increased leak of the sealing fluid to a region where the pressure is lower.

Also, JP-A2003-74712 discloses a mechanical seal that forcibly provides a quenching fluid such as steam around the sliding interface for cooling of the sliding interface. Providing the quenching fluid, however, requires an additional equipment, which inevitably leads to an increase in cost.

In view of the foregoing situation, an object of the present invention is to provide a mechanical seal that prevents deposition of a degradation material generated on a sliding interface.

SUMMARY OF THE INVENTION

To achieve the foregoing object, a first aspect of the present invention provides a mechanical seal comprising a sleeve that rotates with a shaft; a seal cover fixed to a housing through which the shaft is disposed; a rotating ring attached to the sleeve; and a fixed ring attached to the seal cover and disposed in sliding-contact with the rotating ring at a sliding interface perpendicular to the shaft; wherein one of the sleeve and the rotating ring is provided with a scraping member at a position close to an inner edge of the sliding interface.

In the mechanical seal thus configured, the scraping member scrapes off a degradation material about to be deposited inside the sliding interface, thus preventing formation of a secondary sliding interface. Such configuration keeps the degradation material from being deposited even when the sliding interface is heated up, thereby preventing degradation in sealing performance.

A second aspect of the present invention provides a mechanical seal comprising a sleeve that rotates with a shaft; a seal cover fixed to a housing through which the shaft is disposed; a rotating ring attached to the sleeve; and a fixed ring attached to the seal cover and disposed in sliding-contact with the rotating ring at a sliding interface perpendicular to the shaft; wherein the sleeve includes a discharging structure provided on an outer circumferential surface thereof, so as to discharge, upon rotation of the sleeve, a fluid stuck to the sleeve.

The mechanical seal thus configured quickly discharges to outside the sealing fluid that has leaked to a inside of the sliding interface, without retaining the sealing fluid. Such configuration keeps the generated degradation material from sticking to an inner edge of the sliding interface, thereby preventing degradation in sealing performance.

In the mechanical seal according to the second aspect, the discharging structure may be a helical protrusion or groove.

Such configuration allows driving the sealing fluid that has leaked from the sliding interface in an axial direction with a pressure angle of the helical shape thereby to thereby discharge the sealing fluid out of the seal cover, thus preventing the deposition of the degradation material.

In the mechanical seal according to the second aspect, the discharging structure may be of a tapered shape with a diameter increasing toward outside of the seal cover.

Such configuration causes the sealing fluid to move to the larger-diameter portion of the sleeve because of a centrifugal force, thus to be discharged out of the seal cover.

A third aspect of the present invention provides a mechanical seal comprising a sleeve that rotates with a shaft; a seal cover fixed to a housing through which the shaft is disposed; a rotating ring attached to the sleeve; and a fixed ring attached to the seal cover and disposed in sliding-contact with the rotating ring at a sliding interface perpendicular to the shaft; wherein a space defined by the sleeve, the rotating ring, the fixed ring, and the seal cover is filled with a solvent or an inert gas.

In the mechanical seal thus configured, the inert gas prevents denaturation, such as oxidation, of the sealing fluid and impurity, thereby preventing generation of the degradation material, or the solvent dissolves therein the degradation material, thereby preventing the deposition thereof. Consequently, the contact pressure between the sliding interface remains unchanged, and the sealing performance can be kept from being degraded.

Thus, the present invention prevents deposition of the degradation material on an inner edge of the sliding interface, thereby preventing the degradation in sealing performance.

DETAILED DESCRIPTION OF THE PREFERRED EMBODIMENTS

Hereunder, embodiments of the present invention will be described referring to the accompanying drawings.

Figure 1:
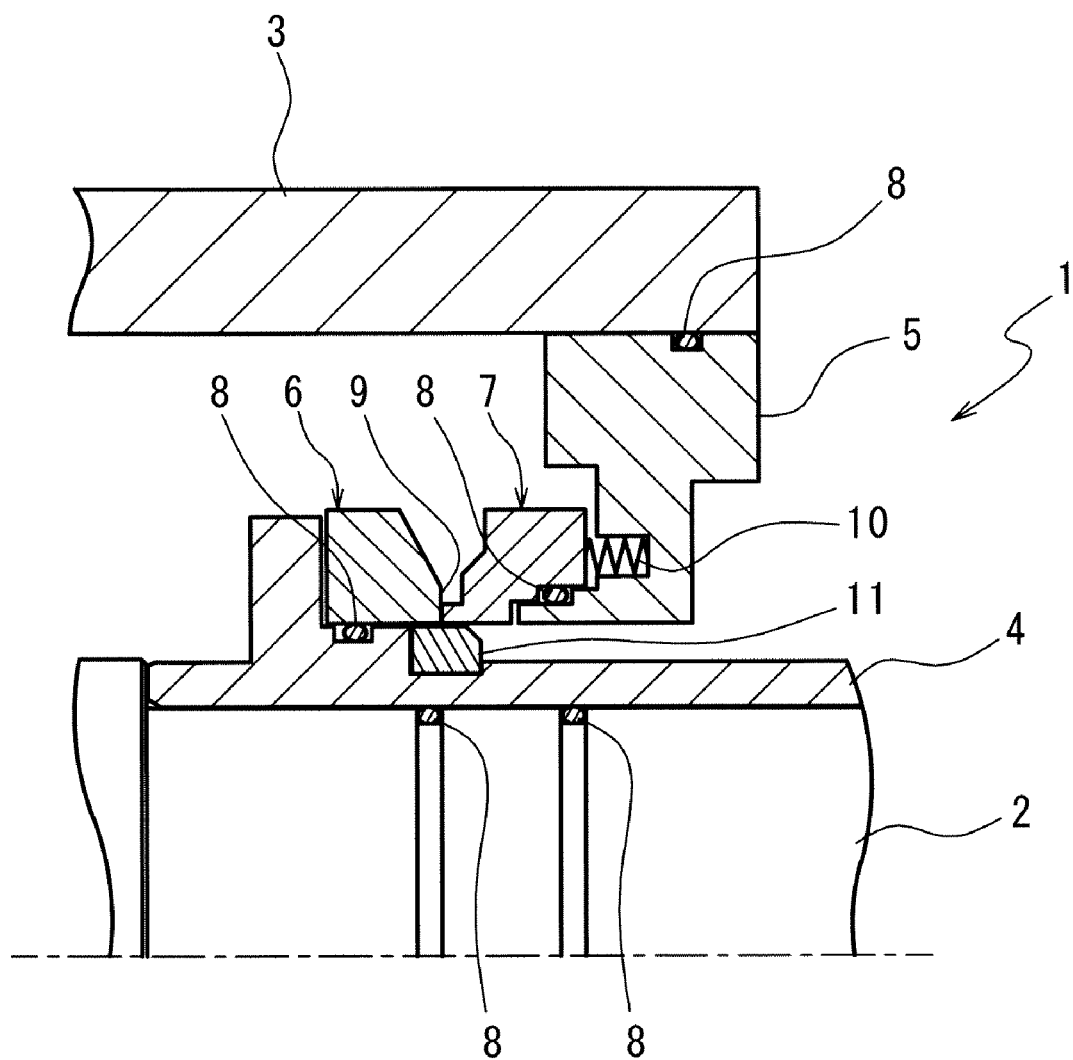
FIG. 1 is a cross-sectional view showing a mechanical seal according to a first embodiment of the present invention.

FIG. 1 is a cross-sectional view showing a mechanical seal 1 according to a first embodiment of the present invention. The mechanical seal 1 serves to seal a gap between a rotating shaft 2 and a housing 3 through which the rotating shaft 2 is disposed. The mechanical seal 1 includes a sleeve 4 fitted to an outer circumference of the rotating shaft 2 so as to rotate therewith, a seal cover 5 immovably fixed to the housing 3, an annular rotating ring (mating ring) 6 attached to an outer circumference of the sleeve 4 so as to rotate with the rotating shaft 2, and a fixed ring (seal ring) 7 which is attached to the seal cover 5, slidably in an axial direction but not rotatably.

The rotating shaft 2, the sleeve 4 and the rotating ring 6 are mutually air-tightly fixed via an O-ring 8, and the housing 3, the seal cover 5 and the fixed ring 7 are also mutually air-tightly fixed via the O-ring 8. The rotating ring 6 and the fixed ring 7 are disposed in sliding-contact with each other at a sliding interface 9 perpendicular to the rotating shaft 2. The fixed ring 7 is biased by a spring 10 toward the rotating ring 6, thus to be pressed against the rotating ring 6 at a predetermined pressure, at the sliding interface 9.

The mechanical seal 1 further includes a scraping member 11 fixed to the sleeve 4 at a position inside of the sliding interface 9. The scraping member 11 is for example made of Teflon (polytetrafluoroethylene) generally in a rectangular parallelepiped shape, and is fitted to a groove formed on the sleeve 4 like a key of a shaft coupling. The topmost portion of the scraping member 11 is disposed against an inner wall of the rotating ring 6 and the fixed ring 7 with a very fine gap, i.e. very close to an inner edge of the sliding interface 9. In this embodiment, the width of the sliding interface 9 is approx. 2 to 4 mm, and the gap between the topmost portion of the scraping member 11 and the inner edge of the sliding interface 9 is approx. 1 mm.

An operation of the mechanical seal 1 thus constructed will now be described hereunder.

The mechanical seal 1 serves to seal in a process gas inside of the housing 3 (left side in FIG. 1) at a higher pressure than outside, within the housing 3. Because of the O-rings 8, the rotating shaft 2, the sleeve 4 and the rotating ring 6 are mutually air-tight, and the housing 3, the seal cover 5 and the fixed ring 7 are also mutually air-tight. Accordingly, the process gas can only flow out to the atmosphere through the gap of the sliding interface between the rotating ring 6 and the fixed ring 7, and then through a gap between the sleeve 4 and the seal cover 5. The spring 10 presses the fixed ring 7 against the rotating ring 6 to thereby keep the gap of the sliding interface 9 from expanding, and a sealing fluid such as a lubricant is provided to the sliding interface 9 to seal the fine gap of the sliding interface 9. Thus, while the mechanical seal 1 allows the sealing fluid to leak, though in a very small quantity, out of the sliding interface 9 to the gap between the sleeve 4 and the seal cover 5, the mechanical seal 1 does not permit the process gas inside the housing 3 to leak out.

In the mechanical seal 1, frictional heat generated by the sliding action between the rotating ring 6 and the fixed ring 7 may cause thermal denaturation of impurity or the like in the lubricant fluid, thereby producing a solid degradation material. The degradation material thus generated leaks together with the sealing fluid out of the sliding interface 9 to an inner region where the pressure is lower (between the sleeve 4 and the seal cover 5). The degradation material adheres to the inner edge of the sliding interface 9, thus to be deposited in a ring shape and to radially grow. The scraping member 11 rotates with the rotating shaft 2, along the inner edge of the fixed ring 7. Accordingly, the degradation material deposited on the inner wall of the fixed ring 7 is scraped off by the scraping member 11. Thus, the degradation material is inhibited from growing toward an inner region from the sliding interface 9, and hence from forming a secondary sliding interface that falsely extends the sliding interface 9. Consequently, the mechanical seal 1 keeps the contact pressure of the fixed ring 7 against the rotating ring 6 unchanged, thereby preventing the degradation in sealing performance.

It should be noted that the positional relationship between the inner edge of the sliding interface 9 and the scraping member 11 located close thereto is not limited to the foregoing configuration. It is preferable to appropriately determine the positional relationship between the inner edge of the sliding interface 9 and the scraping member 11 to be located close thereto, in consideration of the average particle diameter of the substance prone to be stuck to the sliding interface 9 and the level of the sealing performance required from the relevant mechanical seal 1 and so on.

Figure 2:
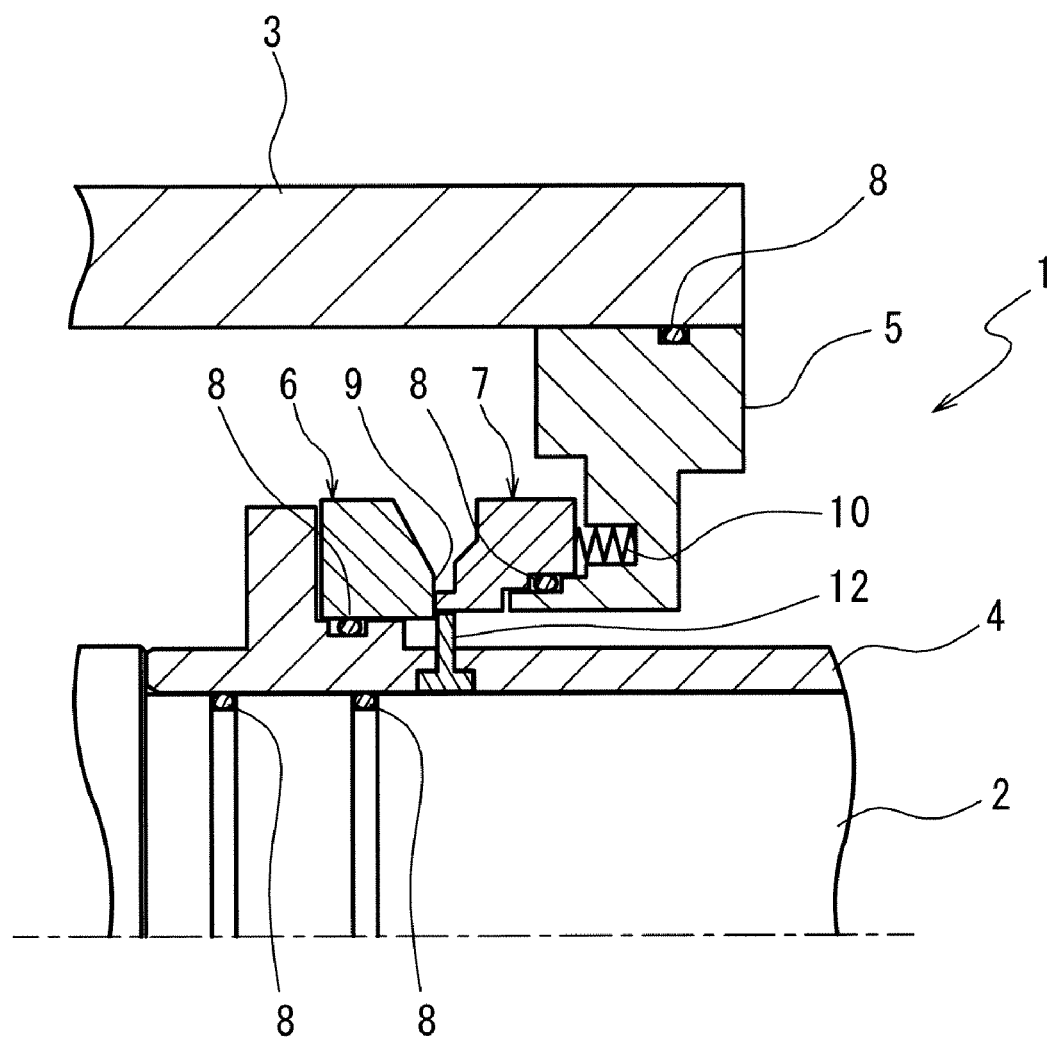
FIG. 2 is a cross-sectional view showing a mechanical seal according to a second embodiment of the present invention.

FIG. 2 depicts the mechanical seal 1 according to a second embodiment of the present invention. In the subsequent passages, the same constituents as those of the first embodiment will be given the same numerals, and the description thereof will not be repeated.

The mechanical seal 1 according to this embodiment includes a pin (scraping member) 12 disposed so as to penetrate through the sleeve 4. The pin 12 is a circular column projecting toward the inner wall of the fixed ring 7, with the tip portion located close to the inner edge of the sliding interface 9.

The pin 12 can also scrape off, as the scraping member 11 of the first embodiment, the deposited degradation material about to grow from the sliding interface 9 toward an inner region, thereby preventing the formation of the secondary sliding interface. The scraping member 11 and the pin 12 may be provided in any numbers circumferentially of the sleeve 4.

Figure 3:
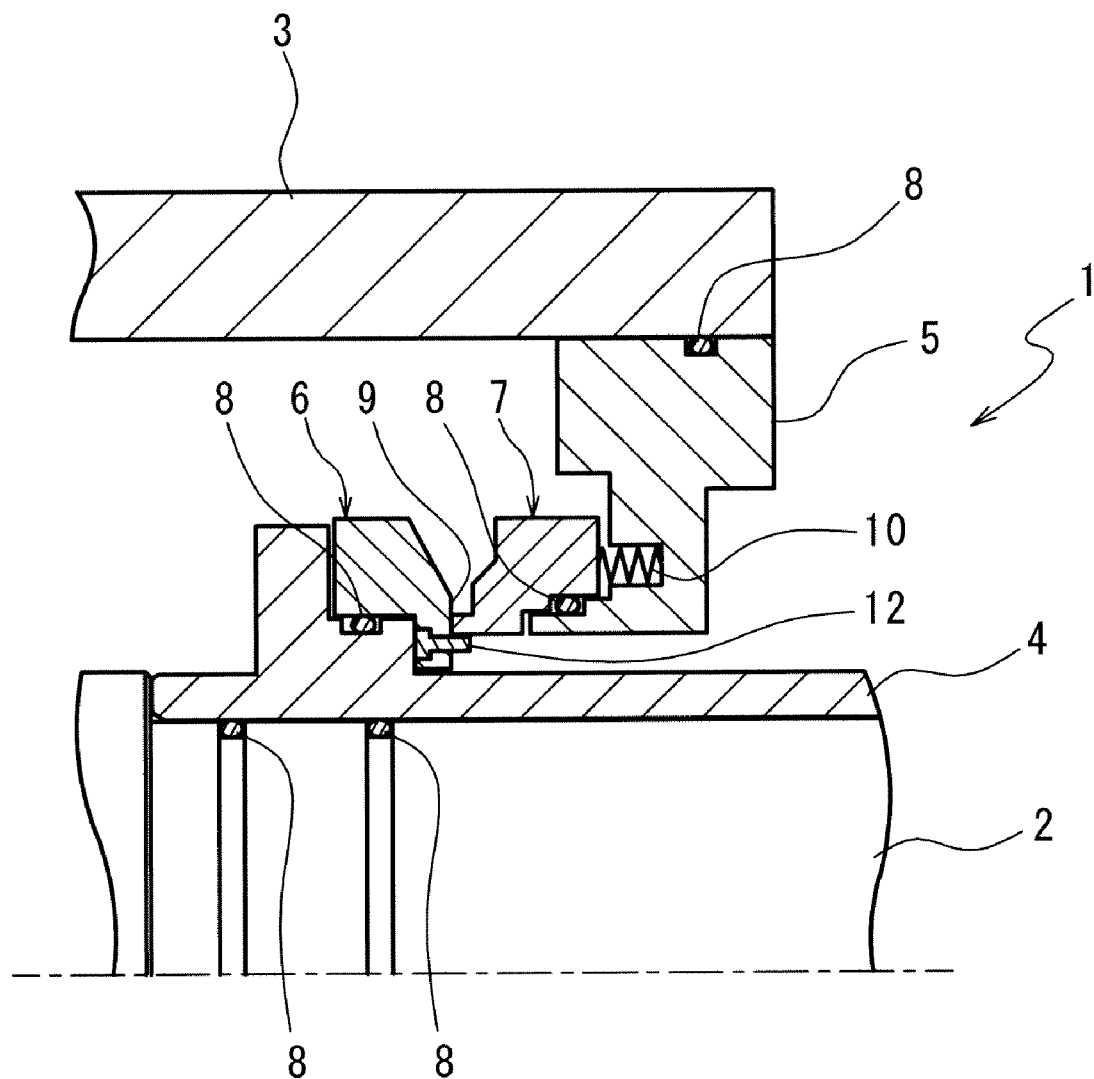
FIG. 3 is a cross-sectional view showing a mechanical seal according to a third embodiment of the present invention.

FIG. 3 depicts the mechanical seal 1 according to a third embodiment of the present invention.

The mechanical seal 1 of this embodiment includes the pin (scraping member) 12 disposed though the rotating ring 6, instead of through the sleeve 4 as in the second embodiment. The pin 12 is a circular column projecting parallel to the rotating shaft 2 from the rotating ring 6, so as to reach a position close to the inner wall of the fixed ring 7, and serves to scrape off, as the scraping member 11 of the first embodiment and the pin 12 of the second embodiment, the deposited degradation material about to grow from the sliding interface 9 toward an inner region, thereby preventing the formation of the secondary sliding interface.

Figure 4:
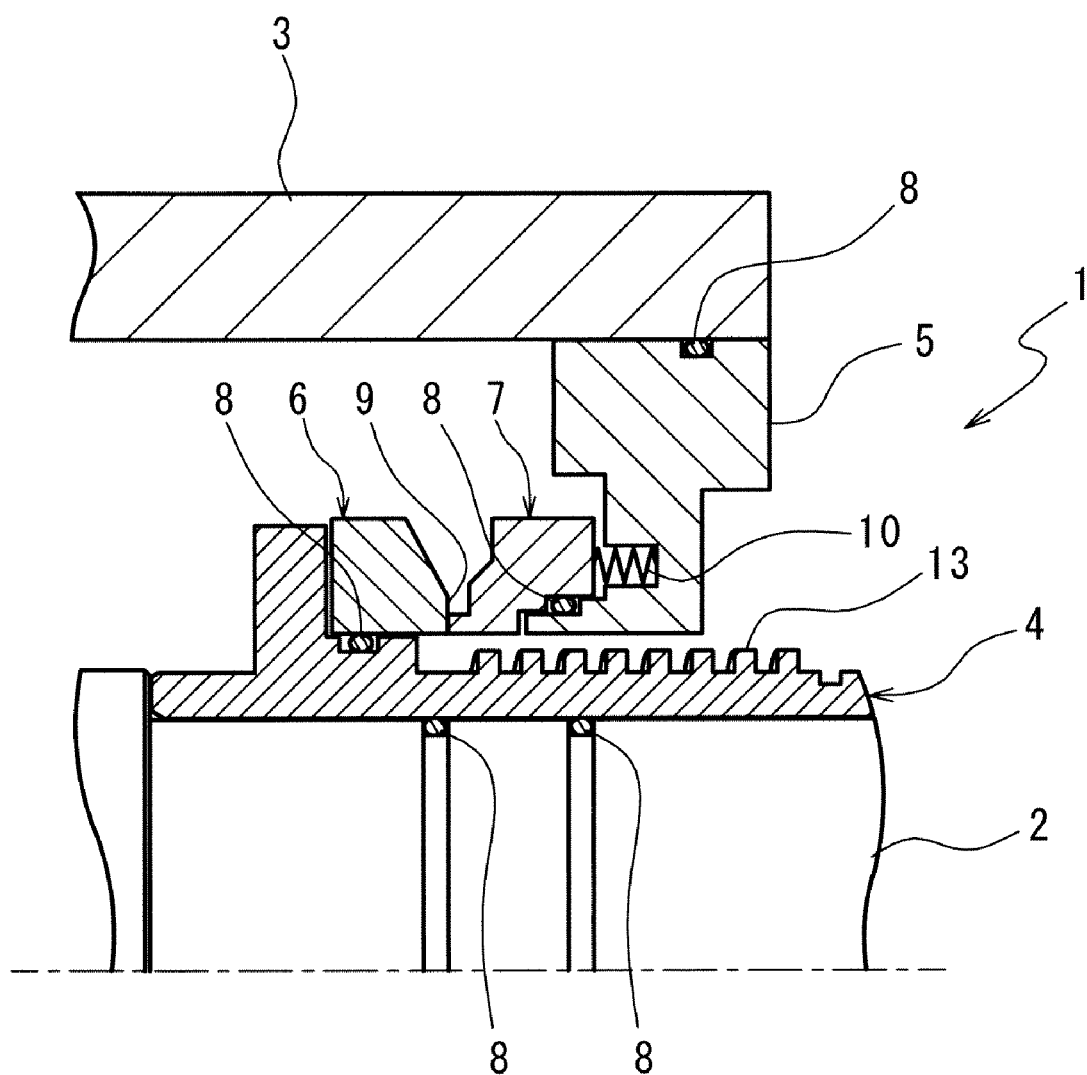
FIG. 4 is a cross-sectional view showing a mechanical seal according to a fourth embodiment of the present invention.

FIG. 4 depicts the mechanical seal 1 according to a fourth embodiment of the present invention.

The mechanical seal 1 according to this embodiment includes, instead of a device that scrapes off the degradation material, a discharge screw 13 constituted of a helical protrusion formed around an outer circumferential surface of the sleeve 4. The rotating shaft 2 of this embodiment rotates in a right direction when viewed from the side of the seal cover 5 (right side in FIG. 4).

The discharge screw 13 is a discharging structure that can convert the rotational force into an axial force with a pressure angle, so as to screw forward the lubricant fluid that has leaked out of the sliding interface 9 along the sleeve 4 with the rotation thereof, thus discharging the lubricant fluid out of the housing 3. The configuration according to this embodiment quickly discharges outwardly the lubricant fluid that has leaked out of the sliding interface 9, without permitting the lubricant fluid to remain on the inner edge of the sliding interface 9. Accordingly, the degradation material contained in the lubricant fluid is discharged to outside by the discharge screw 13 before being stuck to the rotating ring 6 and the fixed ring 7, thus being kept from forming the secondary sliding interface and from degrading the sealing performance.

The sleeve 4 may include a helical groove, or inclined fins, instead of the discharge screw 13 of the protruding form, as the discharging structure.

Figure 5:
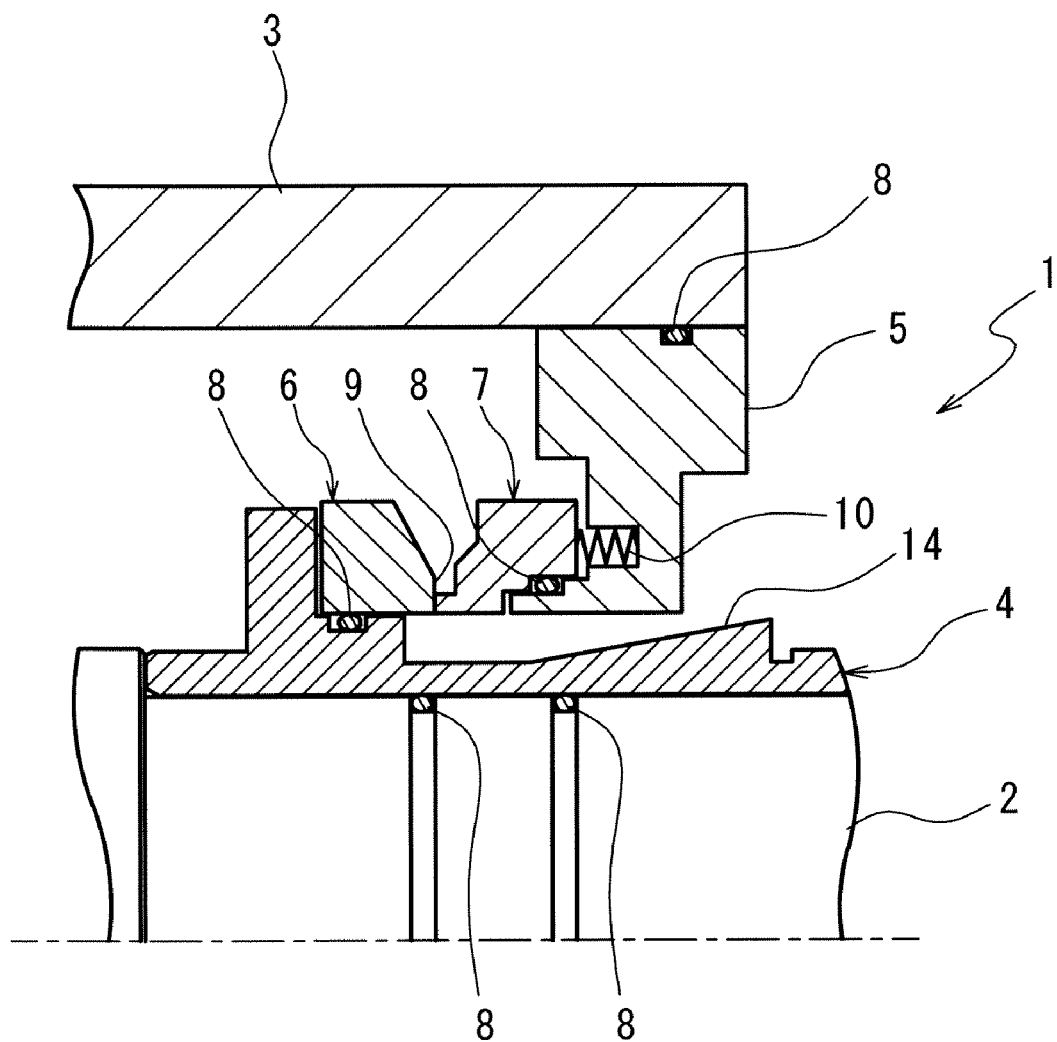
FIG. 5 is a cross-sectional view showing a mechanical seal according to a fifth embodiment of the present invention.

FIG. 5 depicts the mechanical seal 1 according to a fifth embodiment of the present invention.

In the mechanical seal 1 according to this embodiment, the sleeve 4 includes a tapered portion 14 formed around an outer circumference thereof, with the diameter increasing toward outside of the seal cover 5, as the discharging structure. The sealing fluid stuck to the sleeve 4 migrates in a direction that the diameter increases owing to centrifugal force, i.e. toward outside of the seal cover 5 along the surface of the tapered portion 14. Thus, the degradation material can be discharged to outside before being stuck to the rotating ring 6 and the fixed ring 7, so that the degradation in sealing performance can be prevented.

Figure 6:
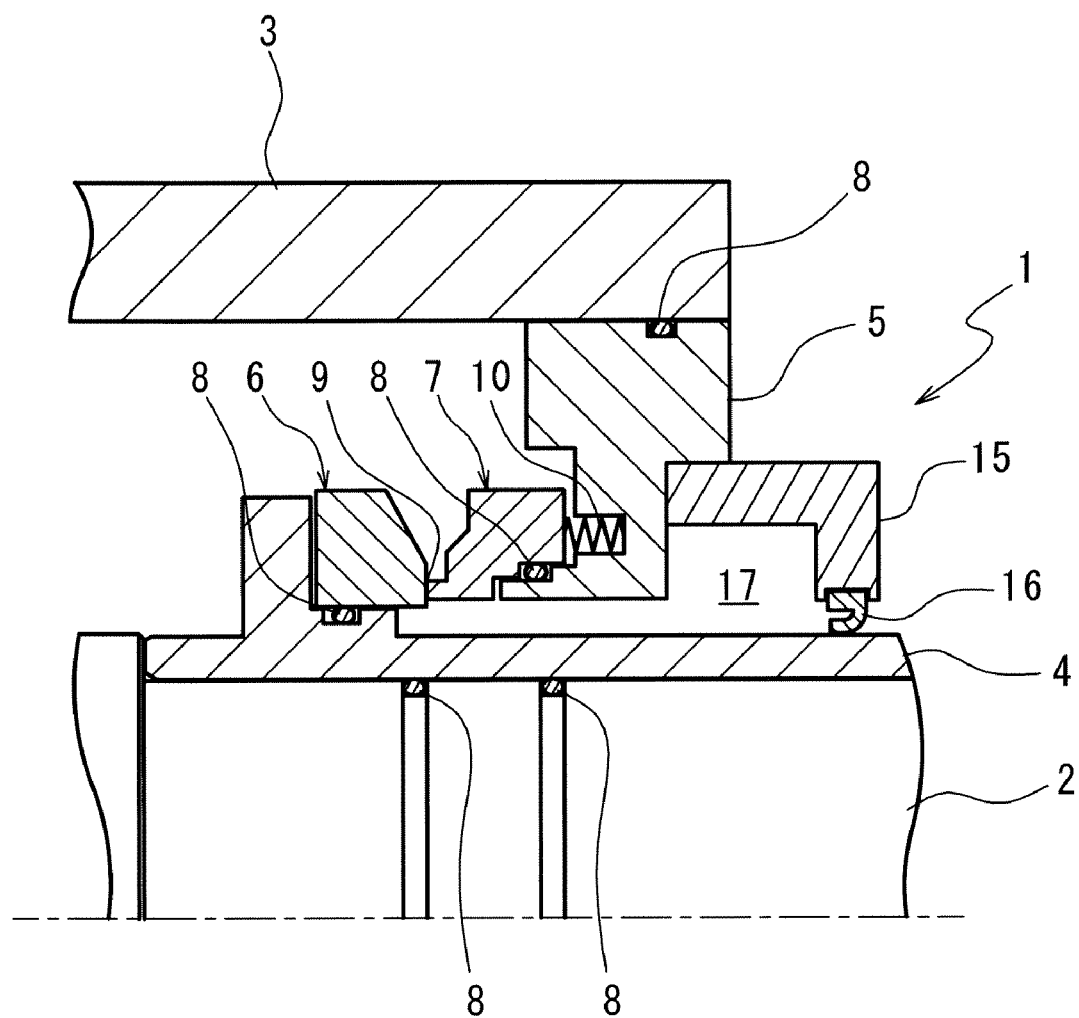
FIG. 6 is a cross-sectional view showing a mechanical seal according to a sixth embodiment of the present invention.

Further, FIG. 6 depicts the mechanical seal 1 according to a sixth embodiment of the present invention.

The mechanical seal 1 according to this embodiment includes an outer cover 15 extending along an outer surface of the seal cover 5 so as to surround the sleeve 4, and a lip seal 16 disposed between the outer cover 15 and the sleeve 4. The outer cover 15 seals a space delimited by the sleeve 4, the rotating ring 6, the fixed ring 7 and the seal cover 5, thereby defining a sealed space 17, which is filled with a solvent (for example an alcohol-based solution).

The degradation material generated on the sliding interface 9 is dissolved in the solvent, and is hence kept from forming the secondary sliding interface and degrading the sealing performance. The lip seal 16 does not provide, like the sliding interface 9, complete sealing performance, and hence the solvent has to be appropriately refilled as it leaks out little by little through the lip seal.

A different type of seal, such as a segment seal may be provided, instead of the lip seal 16. Also, an apparatus that circulates the solvent may be provided.

Figure 7:
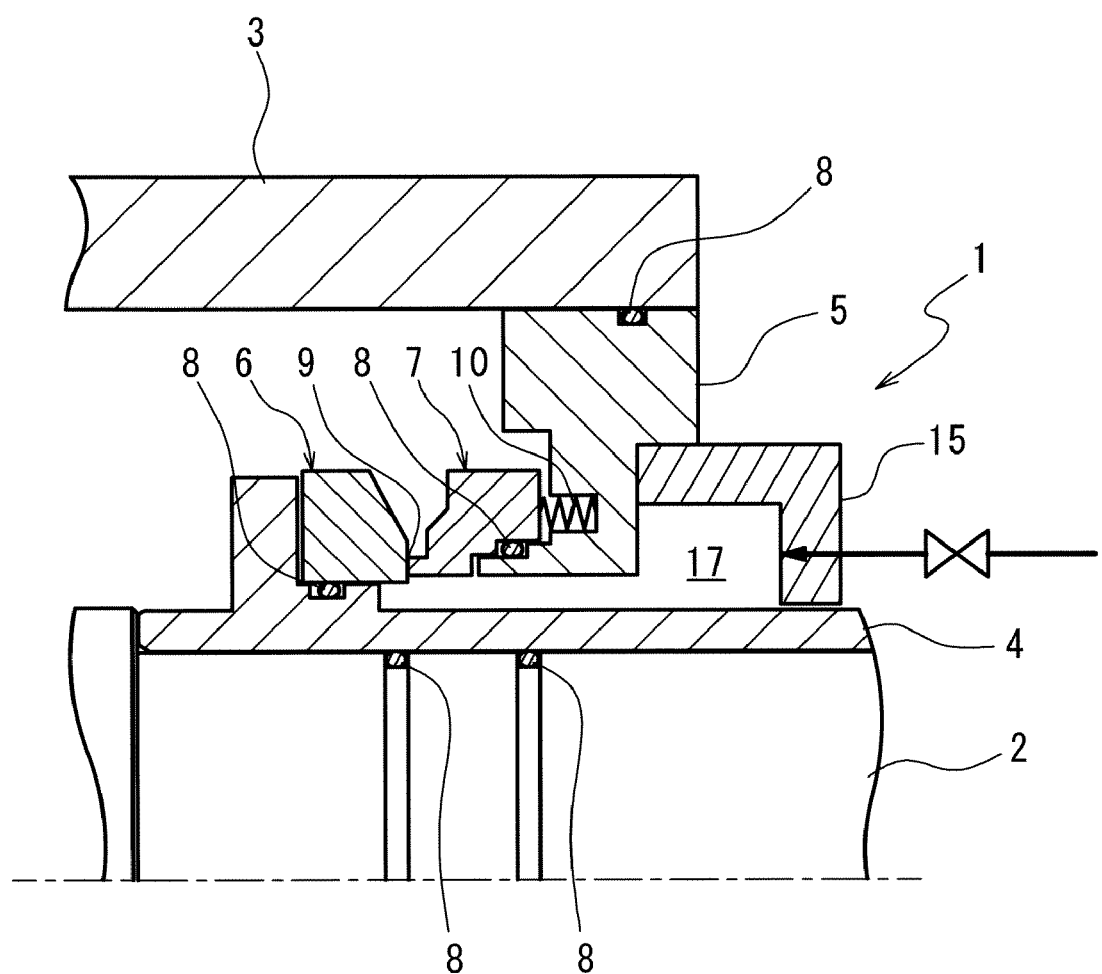
FIG. 7 is a cross-sectional view showing a mechanical seal according to a seventh embodiment of the present invention.

Still further, FIG. 7 depicts the mechanical seal 1 according to a seventh embodiment of the present invention.

In the mechanical seal 1 according to this embodiment, an inert gas (such as nitrogen) is provided in the sealed space 17 sealed by the outer cover 15. The inert gas is discharged to the atmosphere through the gap between the sleeve 4 and the outer cover 15.

The configuration according to this embodiment cuts off the supply of oxygen to the sealing fluid on the sliding interface 9, thereby preventing oxidation of the impurity, hence the generation of the degradation material.

What is claimed is:

1. A mechanical seal comprising:
   a sleeve that rotates with a shaft;
   a seal cover fixed to a housing through which the shaft is disposed;
   a rotating ring attached to the sleeve; and
   a fixed ring attached to the seal cover and disposed in sliding-contact with the rotating ring at a sliding interface perpendicular to the shaft;
   wherein one of the fixed ring and the rotating ring is provided with a scraping member at a position close to an inner edge of the sliding interface, wherein the scraping member extends from the one of the fixed ring and the rotating ring beyond the radially inner edge of the sliding interface and is configured to scrape off a degradation material deposited on the radially inner edge of the sliding interface and a surface of the other of the fixed ring and the rotating ring.

2. The mechanical seal according to claim 1, wherein the scraping member is a circular column projecting parallel to the shaft from the rotating ring, so as to reach a position close to the inner wall of the fixed ring.

3. A mechanical seal comprising:
   a sleeve that rotates with a shaft;
   a seal cover fixed to a housing through which the shaft is disposed;
   a rotating ring attached to the sleeve; and
   a fixed ring attached to the seal cover and disposed in sliding-contact with the rotating ring to define a sliding interface perpendicular to the shaft;
   a scraping member mounted to relatively rotate together with one of the rotating ring and the fixed ring and to extend a position close to a radially inner edge of the sliding interface, wherein the scraping member further extends to scrape off a degradation material deposited on the radially inner edge of the sliding interface and a radially inner surface of the other of the rotating ring and the fixed ring.

4. The mechanical seal according to claim 3, wherein the scraping member is mounted to the sleeve and is elongated to extend from the sleeve in a direction perpendicular to the shaft to scrape a radially inner surface of the fixed ring.

5. The mechanical seal according to claim 3, wherein the scraping member is mounted to the sleeve and is elongated to extend from the sleeve in a direction along the axis of the shaft to scrape a radially inner surface of the fixed ring.

6. The mechanical seal according to claim 3, wherein the scraping member is mounted to the rotating ring and is elongated to extend from the rotating ring in a direction along the axis of the shaft to scrape a radially inner surface of the fixed ring.

* * * * *